US012473114B2

(12) United States Patent
Livingston

(10) Patent No.: US 12,473,114 B2
(45) Date of Patent: Nov. 18, 2025

(54) APPARATUS AND METHOD FOR TESTING LINER AND LABEL SEPARATION

(71) Applicant: Iconex LLC, Duluth, GA (US)

(72) Inventor: Timothy Darren Livingston, Corryton, TN (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 17/669,022

(22) Filed: Feb. 10, 2022

(65) Prior Publication Data

US 2023/0249864 A1 Aug. 10, 2023

(51) Int. Cl.
*B65C 9/00* (2006.01)
*B65C 9/18* (2006.01)

(52) U.S. Cl.
CPC .......... *B65C 9/0006* (2013.01); *B65C 9/1865* (2013.01); *B65C 2009/0009* (2013.01)

(58) Field of Classification Search
CPC ................ B65C 9/0006; B65C 9/1865; B65C 2009/0009
See application file for complete search history.

(56) References Cited

U.S. PATENT DOCUMENTS

| | | | |
|---|---|---|---|
| 5,040,461 A | 8/1991 | Van-ocker | |
| 6,182,730 B1 | 2/2001 | Muir | |
| 6,349,756 B1 | 2/2002 | Brough et al. | |
| 6,431,397 B1 * | 8/2002 | Fishman | B65C 11/00 156/767 |
| 6,962,292 B1 | 11/2005 | Benton et al. | |
| 2010/0012277 A1 | 1/2010 | Farmer et al. | |
| 2017/0266944 A1 * | 9/2017 | Park | B65C 9/0006 |

FOREIGN PATENT DOCUMENTS

| | | |
|---|---|---|
| CN | 103991269 A * | 8/2014 |
| WO | WO-2023154820 A2 | 8/2023 |

OTHER PUBLICATIONS

"The Effect of Peeling Rate and Peeling Angle on the Peeling Strength", Yue Wang, May 2014, the University of Akron. (Year: 2014).*

(Continued)

*Primary Examiner* — Alex B Efta
*Assistant Examiner* — Alexander S Wright
(74) *Attorney, Agent, or Firm* — Schwegman Lundberg & Woessner, P.A.

(57) ABSTRACT

An apparatus for testing label-liner separation is provided. The apparatus comprises a roller, a plurality of replaceable printer peel bars, and a weight. Each peel bar associated with its own unique radius for its disengage edge. A label-liner web is fed under the roller and up to a given peel bar of a given radius over the corresponding disengage edge. A string is attached on one end to a liner portion of the web and the weight is attached to the other end of the string with the weight freely hanging unsupported under the liner portion. A label portion of the web is pulled over the disengage edge to determine whether the label portion separates from the liner portion of the web during the pulling. If no separation occurs a different peel bar with a different radius is selected and tried. This repeats until separation is achieved.

6 Claims, 4 Drawing Sheets

(56) References Cited

OTHER PUBLICATIONS

K Tool International, 72462A Magnetic Toolbox Shelf, available to the public since May 10, 2018. Accessed at <https://www.amazon.com/International-DMG001-Magnetic-Toolbox-Trays/dp/B07CZS1FSC/ref=sr_1_29?crid=1WT2OP5SY4L1F&keywords=placeabl% E2%80%A6> (Year: 2018).*
Laniakea, 2 Pack 1.5 Inch Diameter Conveyor Rollers, available to the public since Nov. 2, 2020. Accessed at <https://www.amazon.com/LANIAKEA-Diameter-Conveyor-Galvanized-Stainless/dp/B08MFHYF1P/ref=sr_1_11?keywords=Conveyor+Rollers&qid=168%E2%80%A6> (Year: 2020).*
AtlasCopco. “Pocket guide on adhesive bonding”. Dated 2019 as per last page. Accessed at <https://www.atlascopco.com/content/dam/atlas-copco/industrial-technique/general/documents/pocketguides/AC-Pocket-Guide-Adhesive-Bonding-EN-web.pdf> (Year: 2019).*
“International Application Serial No. PCT US2023 062319, International Preliminary Report on Patentability mailed Aug. 22, 2024”, 7 pgs.

* cited by examiner

APPARATUS AND METHOD FOR TESTING LINER AND LABEL SEPARATION

BACKGROUND

Many business situations require the use of labels affixed to liners. Printers image the face of the labels and dispense the labels for application at business sites. The printers typically come with built-in peel bars that enable the labels to automatically separate from the liner substrate after imaging and dispensing from the printers. The waste liner is then wound back into a spool for subsequent disposal.

Each business has their own printer and corresponding built-in peel bar. Many factors determine whether a label face sheet will separate properly from the liner substrate when dispensed from a given printer. If the label does not separate from the liner, then the liner does not wind properly into a waste spool causes disruptions during operation of the printer for the business. When this happens, the business is likely to switch to a different label-liner combination before investigating or before even considering a new printer.

Label manufacturers have to manage business customers with different printers and ensure that manufacturer's label-liner products will work for their customers; otherwise, these customers will seek business elsewhere. In addition, the manufacturers have to manage expenses associated with components of their label-liner products, such as the strength and placement of the adhesive used on the backside of the label, the features associated with the release coating that is applied to the front side of the liner, the strength and quality of the substrate used for the label, and the features associated with any thermal imaging coatings applied to the front side of the label.

Currently, the manufacturers have no way of knowing when business customers might obtain different printers, such that previous label-liner products that separated properly when dispensed from the business customers' printers will no longer separate properly with the new/replacement printers. Moreover, manufacturers have no way of knowing when designing new label-liner products or when replacing components of existing label-liner products whether the liners of the new products or the components of the modified products are going to permit proper separation from the labels when printed and dispensed by their customers' printers.

SUMMARY

In various embodiments, an apparatus and a method for testing liner and label separation are provided.

Specifically, and in an embodiment, an apparatus is provided. The apparatus comprises a base element, a roller, and printer peel bars. The roller is integrated into the base element and each printer peel bar is adapted to be placed in and removed from the base element. Each printer peel bar comprises a different radius. The apparatus is adapted to determine a specific printer peel bar having a specific radius at which separation between a label and a liner of a given label-liner product occurs when a web of the given label-liner product is fed under the roller, over a disengage edge of the specific printer peel bar, and out of the base element.

DETAILED DESCRIPTION

Figure 1:
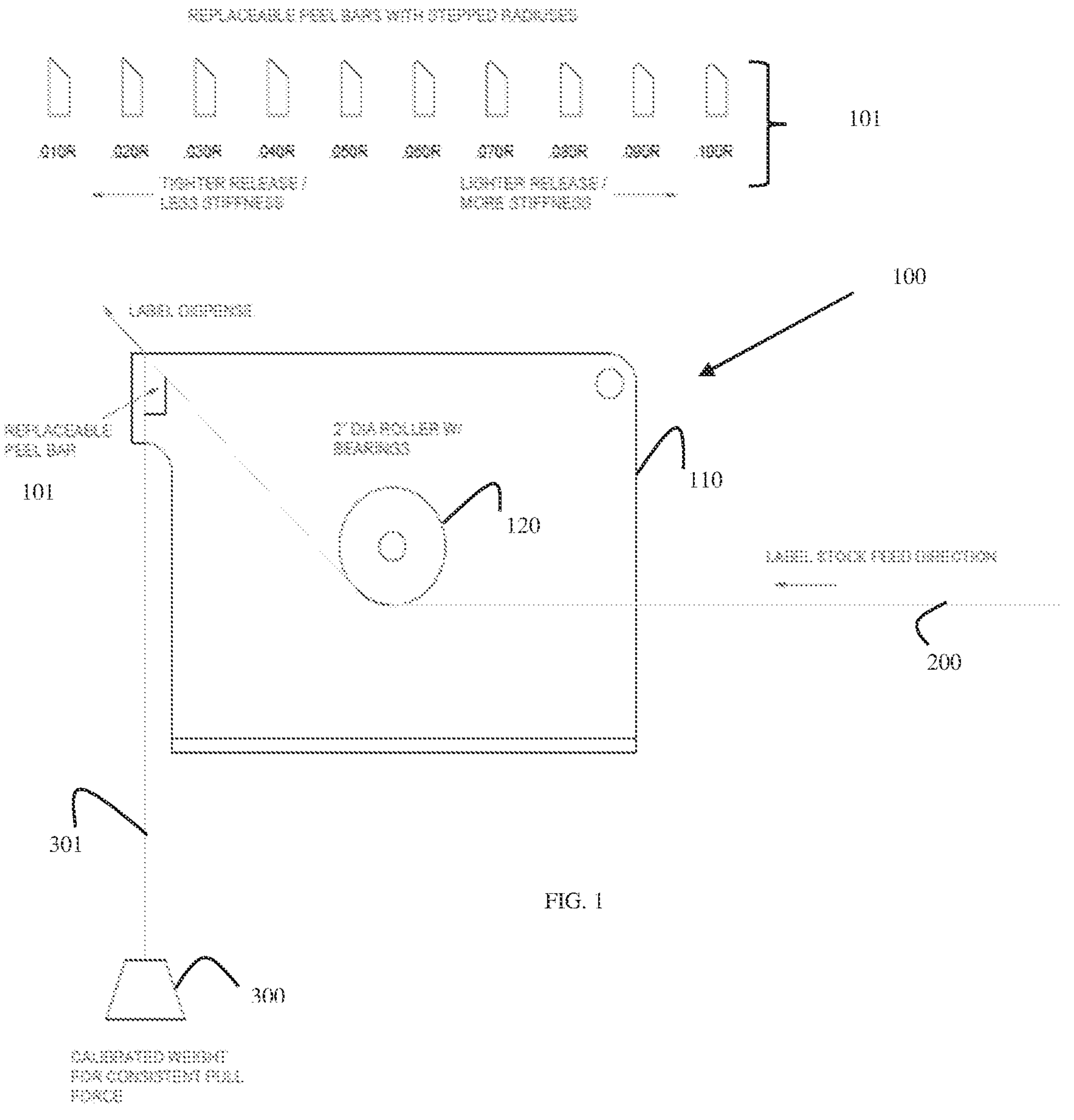
FIG. 1 is a diagram of an apparatus for testing liner and label separation, according to an example embodiment.

FIG. 1 is a diagram of an apparatus 100 for testing liner and label separation, according to an example embodiment. It is noted that the diagram is shown in greatly simplified form with only the components necessary for understanding the apparatus shown. Other components may be added and/or the shown components may be rearranged without departing from the teachings and beneficial aspects of testing liner and label separation.

As used herein a "liner" comprises a substrate made of a translucent or film and is coated with a release coating before being aligned and affixed to a backside of a label. The terms and phrases "liner" and "liner substrate" may be used synonymously and interchangeably herein and below.

A "label" comprises a separate substrate from the liner and a backside of the label is coated with an adhesive before being aligned and affixed to a front side of a liner. The label may or may not also include additional coatings on the front side of label, such as and by way of example only, thermal sensitive coatings to permit a front side and/or portions of a backside of the label to be thermal imaged by thermal printers. The terms and phrases "label," "face stock," "face," and "label substrate" may be used synonymously and interchangeably herein and below.

Apparatus 100 comprises replaceable peel bars of various radiuses 101, a base component 110, and a roller 120. Apparatus 100 may also comprise a calibrated weight 300.

Roller 120 is arranged and oriented within base 100 to receive a label-liner web 200 under a bottom portion of roller 120 and direct a leading edge of web 200 at a predefined angle over replaceable peel bar 101 and out of base 110 (egress or dispense point of apparatus 100).

In an embodiment, web 200 is fed under roller 120 and pulled over a selected replaceable peel bar 101 through and out away from the base 110.

Figure 2:
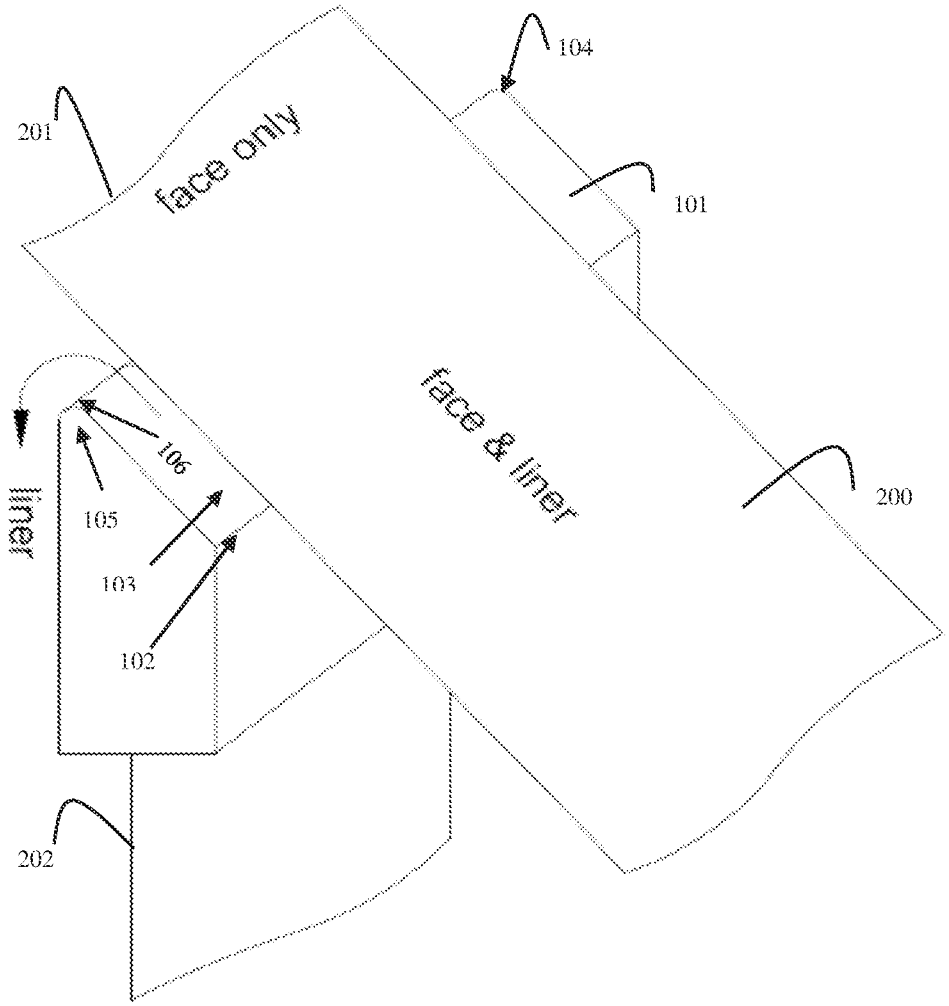
FIG. 2 is a diagram illustrating a printer peel bar with proper liner and label separation, according to an example embodiment.

A calibrated weight 300 is attached to a string 301 and the string 301 is affixed to the underside and backside of the liner 202 (see FIG. 2).

In an embodiment, the calibrated weight 300 is 12 grams.

In an embodiment, an operator of apparatus 100 holds a leasing edge of web 200 by label or face portion for label 201 (see FIG. 2) and pulls the web 200 out away from apparatus 100. Assuming the combination of label stiffness and adhesive with release coatings are sufficient, the liner 202 falls down along a front side wall of peel bar 101 and separates from the label 201.

FIG. 2 illustrates a printer peel bar 101 with proper liner 202 and label 201 separation from web 200, according to an example embodiment. Peel bar 101 has a predefined radius 105 (illustrated by the arrow above 105 in top leftmost corner of peel bar 101). The smaller the radius 105 is the sharper the angle is over dispense edge 106. Web 200 comprises the face stock 201 (label substrate 201) and the liner 202 (liner substrate 202). The web 200 is urged over a top surface 103 of peel bar 101 while a leading edge of the face stock 201 is pulled. String 301 with weight 300 exerts a known and measurable force on liner 202 downward along a front side wall of peel bar 101 and liner 202 separates from label 201.

FIG. 2 illustrates that the stiffness of label substrate 201 is sufficient to over come the bond (the release force) needed to separate liner 202 from label 201 and optimal to allow liner 202 and label 201 to separate with peel bar 101 having radius 105.

Weight 300 is a constant known peel force applied to the back side of liner 202, the release coating on the front side of liner 202 is also known during testing for the web 200 as is the adhesive coating on the backside of label 201, thus, the only variable changed during operation of apparatus 100 for testing label 201 and liner 202 separation of a given web 200 (label-liner product) is the radius 105 (angle over dispense edge 106) of peel bar 101. If liner 202 does not separate from label 201 with a given peel bar of a given radius 105, then a peel bar 101 having a different radius 105 is inserted into apparatus 100 and the test continues with the next radius 105.

There is a direct correlation between the radius 105 chosen for a given peel bar 101 and both the release force needed to separate liner 202 from label 201 and/or the stiffness of the face stock 201 (label 201). This is illustrated in FIG. 1 at the top of the diagram under the various replaceable peel bars 101 with varying radiuses. For example, if a given web 200 (label-liner product 200) is being tested through operation of apparatus 100 with a given peel bar 101 having a given radius and fails to allow liner 202 to separate from liner 202 either the mixture or composition of the release and adhesive coatings have to be changed to decrease the release force and/or the stiffness of the face stock 201 has to change. That is in this situation, the release force has to be decreased between the label 201 and the liner 202, the face stock 201 has to be changed to one that is less stiff, or a combination is needed for a lower release force and a less stiff face stock 201 for the given web 200 and given peel bar 101 with the given radius.

Figure 3A:
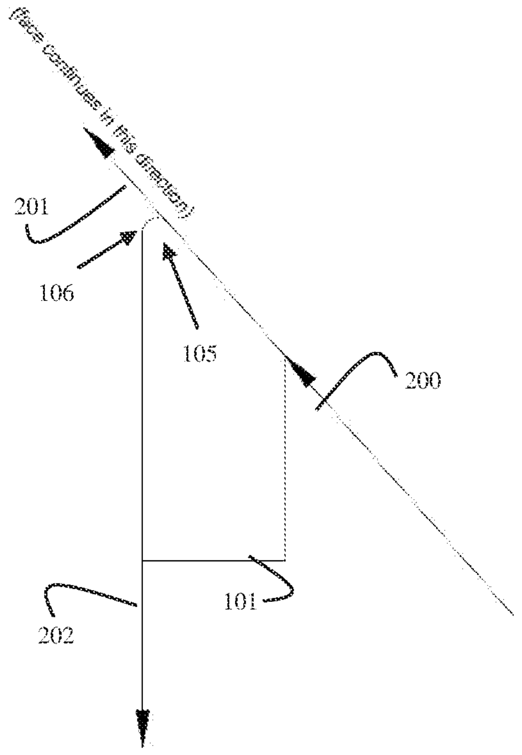
FIG. 3A is a diagram of another printer peel bar with proper liner and label separation, according to an example embodiment.

FIG. 3A is a diagram of another printer peel bar 101 with proper liner 202 and label 201 separation, according to an example embodiment. As the web 200 is pulled over the top surface 103 to dispense a given label 201 over dispense edge 106, radius 105 of peel bar 101 permits separation of liner 202 from label 201 from web 200 with liner web 202 falling down towards weight 300 along the front edge and surface of peel bar 101. This indicates that for any printers having a peel bar 101 with a radius of 105 when using web 200, label 202 will separate from liner 202 and permit liner 202 to be wound in a liner waste spool within the printer.

In FIG. 3A because the radius 105 of peel bar 101 is small (sharp angle), liner 202 travels around dispense edge 106 and the stiffness of the face stock 201 overcomes the bond between the adhesive on the backside of label 201 and the release coating on the front side of liner 202 permitting label 201 to travel in a straight line and dispensing away liner 202; and liner 202 is properly wound in a liner waste spool within a printer.

Figure 3B:
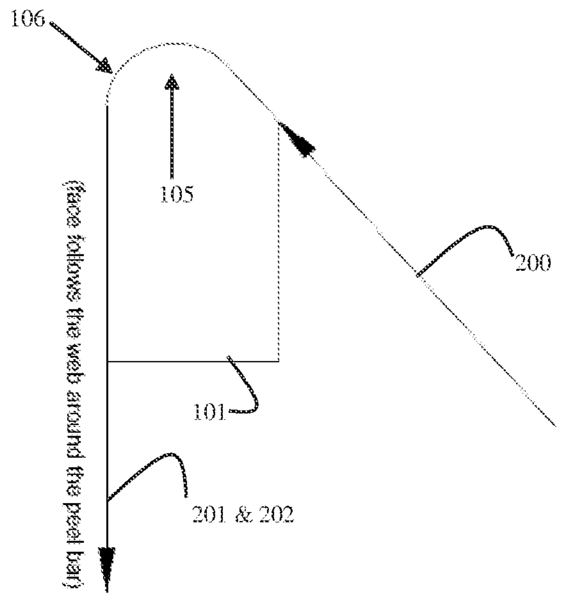
FIG. 3B is a diagram of still another printer peel bar with no separation between the liner and label, according to an example embodiment.

FIG. 3B is a diagram of still another printer peel bar 101 with no separation between the liner 202 and label 202, according to an example embodiment. A larger radius (gradual curved angle) causes the face stock 201 to follow liner 202 over the dispense edge 106 of peel bar 101 and not separate. In this cases the face stock 201 stiffness is insufficient to overcome the bond between the adhesive of the face stock 201 and the release coating of liner 202. This means that the bond between the release coating and the adhesive coating needs to be decreased if the peel bar 101 with radius 105 is needed for a given printer and/or the stiffness of face stock 201 needs increased.

Apparatus 100 permits testing of label-liner products 200 for specific printers having specific peel bars with specific radiuses. Testing enables a label manufacturer to determine whether the release coating, adhesive coating, and/or stiffness in the face stock 201 of the products 200 need to be modified. Modifications to the release coating and/or adhesive coating alters the release force or bond between the backside of label 201 and the front side of liner 202.

As the radius 105 of replaceable peel bars 101 get smaller (sharper dispense angle 106) without label 201 and liner 202 separation from a given web 200 using apparatus 100, the more stiffness is needed in the face stock/label 201.

As the radius of 105 of replaceable peel bars 102 get larger without label 201 and liner 202 separation from a given web 200 using apparatus 100, the less stiffness is needed in the face stock/label 201.

In addition, when a given radius of a replaceable peel bar 102 fails to obtain label 201 and liner 202 separation from a given web 200 using apparatus, the release coatings and/or adhesive coatings can be changed to achieve a weaker bond (require less release force) between label 201 and liner 202.

So both increased or decreased face stock/label 201 stiffness and/or weakened bonds via the release and adhesive coatings can be changed in a label-liner produce when a known peel bar 101 having a known radius 105 of a given printer is required.

Apparatus 100 permits peel bars 101 of variable radiuses to be swapped in and out of base 110 for purposes of testing a proper dispensing of a label 201 for a given label-liner product 200. The industry has been unable to provide such a label dispensability testing mechanism and as such label manufacturers may find that significant investments in new or changed label-liner products are unable to properly dispense from their customer printers before the products or product changes are released. Apparatus 100 permits label manufactures to know (not guess or hope) in advance whether a new or changed label-liner product 200 will dispense for their customers' printers such that if changes are needed for label dispensing the changes can be made before release of the products 200. Apparatus 100 also permits label manufacturers to customize label-liner products 200 for specific printers for optimal operation of such printers when dispensing labels 201 and when spooling liner 202.

In an embodiment, apparatus 100 comprises a motor that drives roller 120 urging web 200 automatically towards peel bar 101 and over dispense edge 106.

In an embodiment, apparatus 100 comprises an adhesive chain under peel bar 101 that adheres to a backside of liner 202 on one end and the other end applies or comprises force (weight 300).

In an embodiment, roller 120 is a 2 inch in diameter roller with bearings.

In an embodiment, weight 300 can be changed as needed.

In an embodiment, a position of roller 120 and correspondingly an angle with which web 200 is fed from roller 120 to peel bar 101 and over dispense edge 106 is adjustable within base 110 of apparatus 100.

In an embodiment, an optimal label 201 and liner 202 separation for any given label-liner product 200 is one in which the separation occurs with a peel bar 101 having a radius of 0.04 or higher. In an embodiment, apparatus 100 is used to test any stiffness of face stock 201 and any bond between face stock 201 and liner 202 for all released changed or new label-liner products 200 to ensure label 201 and liner 202 separation on any peel bar 101 having the radius of 0.04 or higher and modifications are made when no separation is achieved in the stiffness and/or the bond (via the release coating and/or adhesive coatings).

Figure 4:
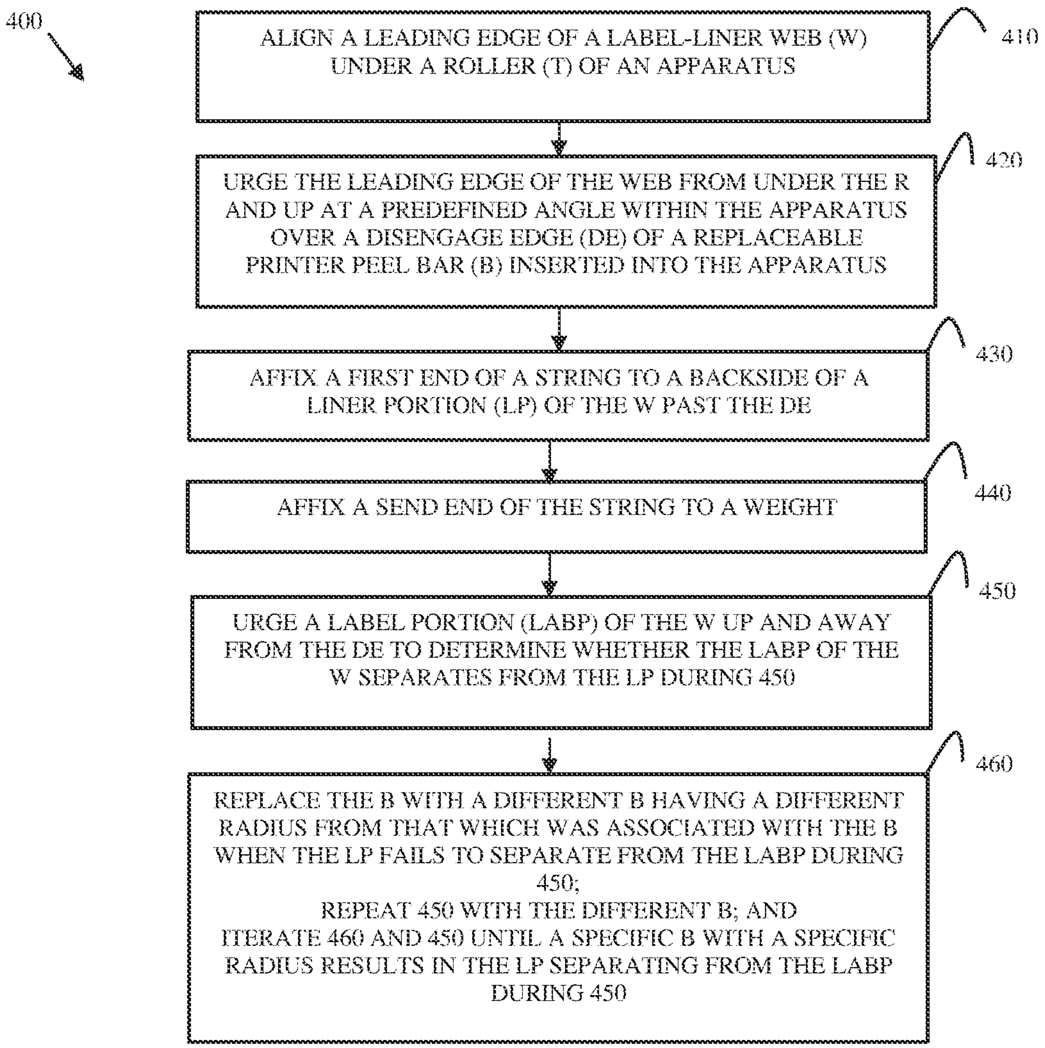
FIG. 4 is a diagram of a method for operating the apparatus, according to an example embodiment.

FIG. 4 is a diagram of a method 800 for operating apparatus 100, according to an example embodiment.

At 410, a leading edge of a label-liner web 200 is aligned under a roller 120 of an apparatus 100.

At 420, the leading edge of web 200 is urged under the roller 120 and up at a predefined angle within the apparatus 100 over a disengage edge 106 of a replaceable printer peel bar 101 inserted into the apparatus 100.

At 430, a first end of a string 301 is affixed to a backside of a liner portion 202 of the web 200 past the disengage edge 106.

At 440, a second end of the string 301 is affixed to a weight 300.

At 450, a label portion 201 of the web 200 is urged up and away from the disengage edge 106 to determine whether the label portion 201 of the web 200 separates from the liner portion 202 during 450.

In an embodiment, at 460, the peel bar 101 is replaced with a different peel bar 101 having a different radius from that which was associated with the original peel bar 101 when the liner portion 202 fails to separate from the label portion 201 during 450. 450 is repeated with the different peel bar 101. 460 and 450 are iterated until a specific peel bar 101 with a specific radius results in the liner portion 202 separating from the label portion 201 during 450.

Although the present invention has been described with particular reference to certain preferred embodiments thereof, variations and modifications of the present invention can be affected within the spirit and scope of the following claims.

The invention claimed is:

1. An apparatus, comprising:

a roller situated below a disengage edge and at a predefined angle from the disengage edge, wherein the disengage edge is associated with a replaceable printer peel bar having a predefined radius;

a weight attached to a string on a bottom end of the string; and the string attached on a top end to a backside of a liner portion associated with a label-liner web fed under the roller and up and over a topmost left corner of the disengage edge at the predefined angle;

wherein the apparatus further comprises a motor configured to drive the roller to urge the label-liner web along a track from an infeed towards the replaceable printer peel bar;

wherein the apparatus is configured to allow a plurality of replaceable printer peel bars having variable radiuses to be swapped in and out of a base element allowing determination of a particular replaceable printer peel bar having a particular predefined radius that permits the liner portion to separate from a label portion of the label-liner web when the label portion is pulled over the disengage edge of the particular replaceable printer peel bar and a downward force of the weight is being constantly applied to the backside of the liner portion;

wherein a position of the roller and correspondingly the predefined angle with which the label-liner web is fed from the roller to the replaceable printer peel bar and over the disengage edge is adjustable within the base element;

wherein the roller has a two-inch diameter with bearings.

2. The apparatus of claim 1 further comprising, the plurality of replaceable printer peel bars with the variable radiuses, wherein the variable radiuses include stepped radiuses, wherein the replaceable printer peel bar and the particular replaceable printer peel bar are two of 10 of the plurality of replaceable printer peel bars.

3. The apparatus of claim 1 further comprising, a shelf to hold a selectable one of the plurality of replaceable printer peel bars when placed in the apparatus.

4. The apparatus of claim 3, wherein the shelf is situated above the roller at the predefined angle and is adapted to hold the selectable one of the plurality of replaceable printer peel bars.

5. The apparatus of claim 4 further comprising, the base element or a housing that comprises the roller and the shelf.

6. The apparatus of claim 1, wherein the weight is 12 grams that hangs freely from the bottom end of the string.

* * * * *